United States Patent
Nomura (10) Patent No.: US 8,891,175 B2
(45) Date of Patent: Nov. 18, 2014

(54) LENS-FRAME MOVING MECHANISM

(75) Inventor: Hiroshi Nomura, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/554,173

(22) Filed: Jul. 20, 2012

(65) Prior Publication Data

US 2013/0033760 A1  Feb. 7, 2013

(30) Foreign Application Priority Data

Aug. 2, 2011 (JP) ................. 2011-168886

(51) Int. Cl.
G02B 15/14 (2006.01)
G02B 7/08 (2006.01)
G02B 7/10 (2006.01)

(52) U.S. Cl.
CPC . G02B 7/102 (2013.01); G02B 7/08 (2013.01); G02B 7/10 (2013.01)
USPC ........... 359/694; 359/696; 359/698; 359/702; 359/706

(58) Field of Classification Search
CPC .............. G02B 7/10; G02B 7/08; G02B 7/04; G02B 7/102
USPC .................................. 359/694–706
See application file for complete search history.

(56) References Cited

U.S. PATENT DOCUMENTS

| | | | |
|---|---|---|---|
| 6,370,334 B1 | 4/2002 | Ishikawa | |
| 6,959,148 B2 | 10/2005 | Nomura | |
| 6,978,089 B2 | 12/2005 | Nomura et al. | |
| 6,990,291 B2 | 1/2006 | Nomura | |
| 7,167,644 B2 | 1/2007 | Nomura | |
| 7,196,858 B2 | 3/2007 | Aoki | |
| 7,338,219 B2 | 3/2008 | Ishizuka et al. | |
| 7,483,069 B2 * | 1/2009 | Omiya et al. | 348/335 |
| 7,782,547 B2 | 8/2010 | Nomura et al. | |
| 8,041,204 B2 | 10/2011 | Nomura | |
| 2006/0034001 A1 * | 2/2006 | Nagai et al. | 359/694 |
| 2009/0125926 A1 * | 5/2009 | Nomura | 720/658 |
| 2009/0232485 A1 * | 9/2009 | Sasaki | 396/73 |
| 2009/0249901 A1 * | 10/2009 | Tsuchiya | 74/24 |
| 2011/0141566 A1 * | 6/2011 | Suzuka | 359/557 |

FOREIGN PATENT DOCUMENTS

| | | |
|---|---|---|
| JP | 2001-215395 | 8/2001 |
| JP | 2009-134249 | 6/2009 |
| JP | 2009-192965 | 8/2009 |

* cited by examiner

*Primary Examiner* — Scott J Sugarman
*Assistant Examiner* — Daniele Manikeu
(74) *Attorney, Agent, or Firm* — Greenblum & Bernstein, P.L.C.

(57) ABSTRACT

A lens-frame moving mechanism includes a lens frame guided to move between a ready-to-photograph position and a retracted position, the lens frame being biased forwardly by a biaser; an intermediate linearly movable member, wherein the lens frame contacts the intermediate linearly movable member; a leading screw formed on the drive shaft of a motor; a nut member screw-engaged onto the leading screw, wherein the nut member does not rotate relative to the lens frame and moves the intermediate linearly movable member in the optical axis direction; and a rearwardly-movable member which rearwardly moves the lens frame against the biasing force such that the lens frame moves away from the intermediate linearly movable member in the optical axis direction while the lens frame is moved from the ready-to-photograph position to the retracted position.

7 Claims, 6 Drawing Sheets

LENS-FRAME MOVING MECHANISM

BACKGROUND OF THE INVENTION

1. Field of the Invention

The present invention relates to a lens-frame moving mechanism which forwardly or rearwardly moves a lens group in the ready-to-photograph position by a motor-driven leading screw, and which moves the lens group between the ready-to-photograph position and the retracted position.

2. Description of the Related Art

In a known type of a mechanism for moving a focusing lens group in the optical axis direction, a focusing lens group frame is movably biased toward an object to be photographed (hereinafter, the object side), and a nut member is screw-engaged with a leading screw, which is rotatably driven by a motor, so that the nut member does not rotate relative to the focusing lens group frame and presses against the focusing lens group to move the focusing lens group against the biasing force. This known structure is disclosed in Japanese Unexamined Patent Publication No. 2009-134249.

According to Japanese Unexamined Patent Publication No. 2009-134249, the rotation of the motor is transmitted via a gear train to a leading screw, enabling the length (thickness) of a lens-frame moving mechanism along an optical axis to be reduced.

However, in a lens-frame moving mechanism using a gear train, noise caused by the rotation of the gear train is inevitable. In particular, in a camera provided with a motion-picture function, this noise is undesirably recorded during the recording of a movie. In order to reduce such noise, it is preferable that a motor driving shaft be a leading screw, and a nut member be directly screw-engaged with the leading screw, without using the gear train.

On the other hand, the above-described mechanism (motor shaft leading-screw mechanism) in which a focusing lens group (frame) is moved by the nut member that is screw-engaged with a motor shaft leading screw (i.e., the leading screw is formed on the shaft of the motor), faces the following problems. Namely, in a miniaturized camera, it is general design practice to position a focusing lens group at a position closest to the image-side of the photographing lens system, and it is desirable for the focusing lens group to be moved along the optical axis toward the image side to attain the retracted position of the photographing lens system. Secondly, in the photographing lens system having a longer back-focus, the traveling distance of the focusing lens group from the retracted position to the ready-to-photograph position (the short focal-length extremity or the long focal-length extremity) inevitably becomes longer (i.e., the traveling distance of the focusing lens group toward the image side from the ready-to-photograph position to the retracted position becomes longer).

In the above-explained conventional lens-frame moving mechanism, the longer the traveling distance of the focusing lens group from the ready-to-photograph state to the retracted state, the longer the length of the leading screw. Consequently, miniaturization of the lens-frame moving mechanism in the optical axis direction becomes difficult.

SUMMARY OF THE INVENTION

The present invention provides a lens-frame moving mechanism which does not require a long leading screw, even in the case where the traveling distance of a specific lens group (e.g., the focusing lens group) from the ready-to-photograph state to the fully-retracted state is long, and which can attain a reduction in the thickness (in the optical axis direction) thereof.

More specifically, according to the lens-frame moving mechanism of the present invention, when the above-mentioned specific lens group is moved between the ready-to-photograph position and the retracted position, the leading screw and the nut member are not used, whereas after the lens group reaches the ready-to-photograph position (i.e., the zooming range), the leading screw and the nut member are used to move the specific lens group in the optical axis direction. In order to attain this arrangement, in addition to the lens frame of the specific lens group, an intermediate linearly movable member, which interconnects with the specific lens group, the leading screw and the nut member, is provided. When the specific lens group (frame) moves between the ready-to-photograph position and the retracted position, the intermediate linearly movable member does not act on the specific lens group to move, whereas after the specific lens group (frame) reaches the ready-to-photograph position, the specific lens group (frame) integrally moves with the intermediate linearly movable member.

According to an aspect of the present invention, a lens-frame moving mechanism is provided, including a lens frame which holds a lens group and is linearly guided to move, in an optical axis direction of the lens group, between a ready-to-photograph position and a retracted position, the lens frame being biased forwardly in the optical axis direction by a biaser; an intermediate linearly movable member which is linearly guided to move in the optical axis direction, wherein the lens frame that is forwardly biased by the biaser in the optical axis direction contacts the intermediate linearly movable member; a leading screw which is directly formed on the drive shaft of a motor, by which the leading screw is rotated; a nut member which is screw-engaged onto the leading screw, wherein the nut member does not rotate relative to the lens frame and is arranged to move the intermediate linearly movable member in the optical axis direction; and a rearwardly-movable member which is arranged to rearwardly move the lens frame against the biasing force applied thereto by the biaser in a manner such that the lens frame moves away from the intermediate linearly movable member in the optical axis direction while the lens frame is moved from the ready-to-photograph position to the retracted position.

It is desirable for a traveling distance of the lens frame from the ready-to-photograph position to the retracted position to be 2 mm or more.

It is desirable for the lens group held by the lens frame to include a focusing lens group which is positioned closest to the image side of a photographing lens system including a plurality of lens groups.

It is desirable for an origin detector, which detects a position of the intermediate linearly movable member in the optical axis direction, to be provided between the intermediate linearly movable member and a stationary member.

It is desirable for the motor to be mounted to the stationary member so that the leading screw extends forwardly in the optical axis direction.

It is desirable for the rearwardly-movable member to be arranged to be driven by a second motor other than the motor having the leading screw, the rearwardly-movable member including an annular member which is arranged to move in the optical axis direction.

It is desirable for a first guide shaft for linearly guiding the leading screw and a second guide shaft for linearly guiding the intermediate linearly movable member to be provided radially outside of the annular member.

The present disclosure relates to subject matter contained in Japanese Patent Application No. 2011-168886 (filed on Aug. 2, 2011) which is expressly incorporated herein by reference in its entirety.

BRIEF DESCRIPTION OF THE DRAWINGS

The present invention will be discussed below in detail with reference to the accompanying drawings, in which.

DESCRIPTION OF THE EMBODIMENTS

The zoom lens barrel 1 is provided with a photographing optical system having a four lens groups, including a first lens group LG1, a second lens group LG2, a diaphragm and shutter unit S, a third lens group LG3, a fourth lens group LG4 and a low-pass filter LPF; and is provided with a CCD (an image sensor) 20, in that order from the object side. The photographing optical system is a zoom optical system, in which the focal length of the photographing optical system is variable by moving the first through the fourth lens groups LG1 through LG4 in the optical axis direction according to predetermined moving paths. Furthermore, focusing is performed by moving the fourth lens group LG4 in the optical axis direction. The lens-frame moving mechanism according to the present invention is applied to the fourth lens group LG4 in the illustrated embodiment.

Note that in explanations hereinafter, the optical axis direction refers to a direction along, or parallel to, the photographing optical axis O of the photographing optical system; the "forward" direction refers to a direction along the optical axis toward the object side, and the "rear" direction refers to a direction along the optical axis toward the image side.

The zoom lens barrel 1 is provided with a stationary barrel (stationary member) 22 in which the first lens group LG1, the second lens group LG2, the third lens group LG3 and the fourth lens group LG4 are movably supported, and with a lens-barrel rear plate 21 behind the stationary barrel 22. The CCD 20 and the low pass filter LPF are mounted on the lens-barrel rear plate 21.

The lens-frame moving mechanism according to the present invention will be explained hereinafter.

A first advancing barrel (a rearwardly-movable member (a rearward driving member)) 15, which is arranged to pass through an opening 22a of the stationary barrel 22, is driven by a zoom motor (second motor) M via a pinion gear 61 (that extends in a direction parallel to the optical axis) and moves forwardly and rearwardly in the optical axis direction while rotating, by a cam mechanism, with respect to the stationary barrel 22. A second advancing barrel 13 and a third advancing barrel 12 are radially provided, in that order toward the photographing optical axis O, inside the first advancing barrel 15. When the first advancing barrel 15 rotates, the second advancing barrel 13 and the third advancing barrel 12 move in the optical axis direction. The first lens group LG1 is supported by the third advancing barrel 12. A cam ring 11 and a second-lens-group frame 3 holding the second lens group LG2 are radially provided, in that order toward the photographing optical axis O, in the third advancing barrel 12. The cam ring 11 is arranged to rotate and move, by the rotation of the first advancing barrel 15, in the optical axis direction, and the second-lens-group frame 3 is linearly movable in the optical axis direction without rotating relative to the stationary barrel 22. The positions (movement) of the third advancing barrel 12 (the first lens group LG1) and the second-lens-group frame 3 (the second lens group LG2) are controlled (guided) by cam grooves formed on the cam ring 11 and followers provided on the third advancing barrel 12 and the second-lens-group frame 3.

Figure 1:
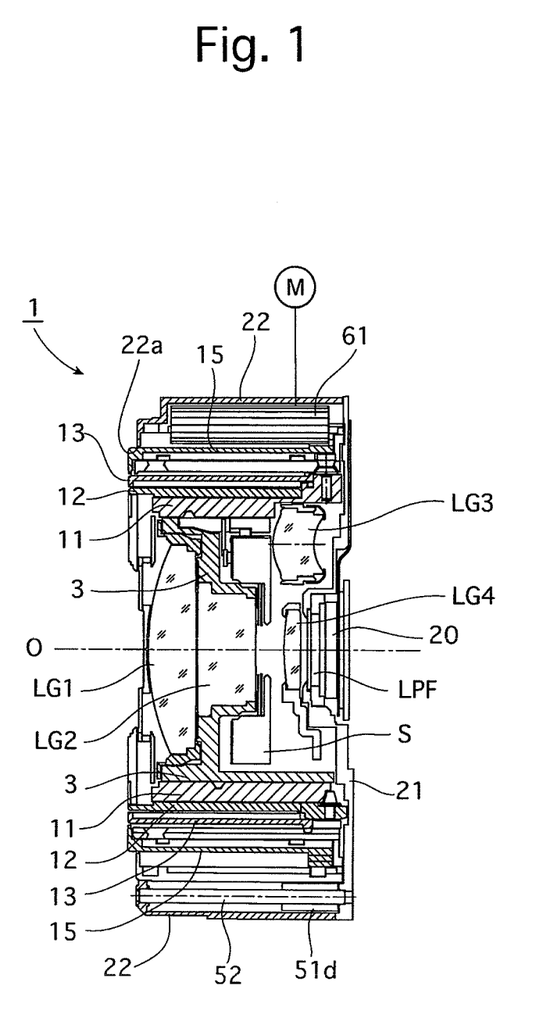
FIG. 1 is a cross-sectional view showing the fully-retracted state of the zoom lens barrel to which the lens-frame moving mechanism of the present invention is applied.
Figure 2:
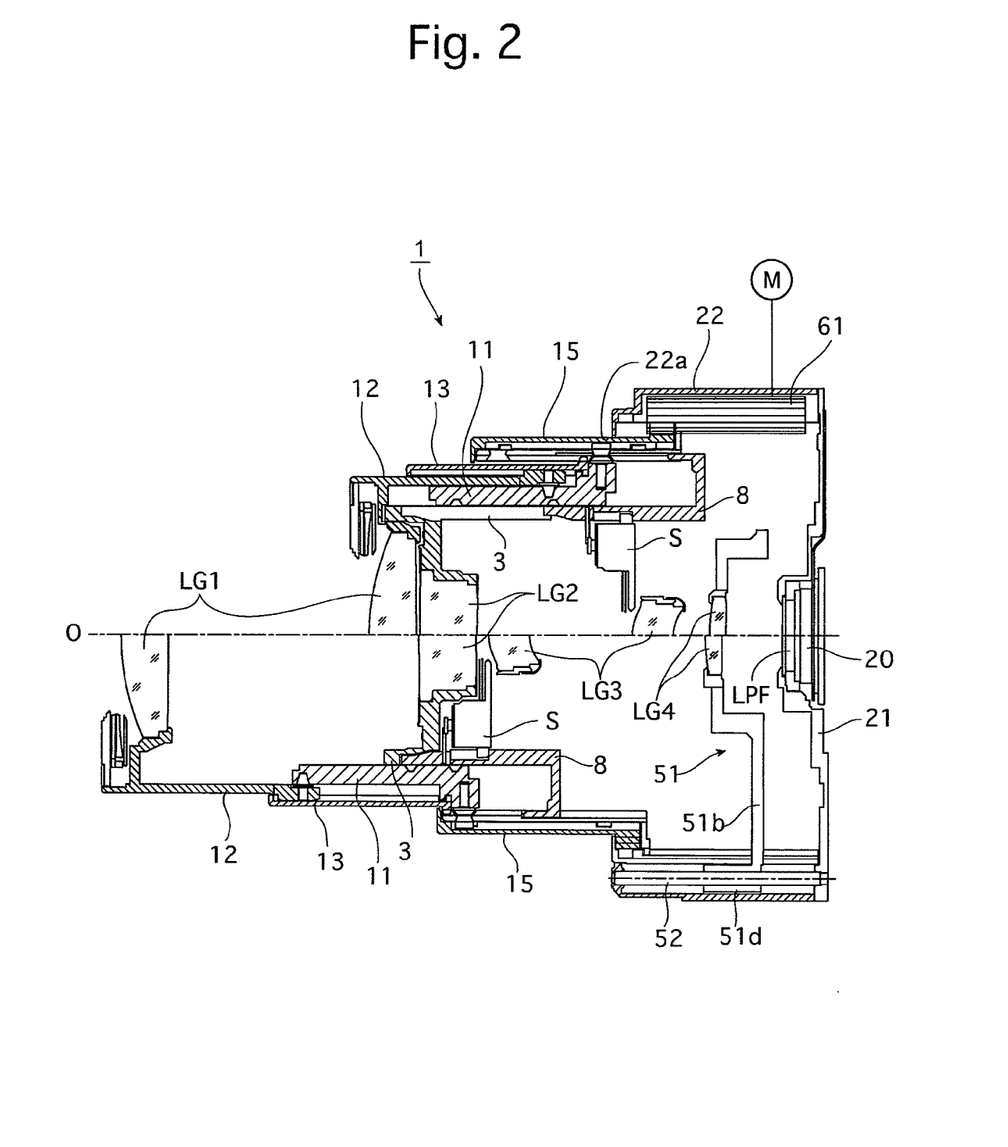
FIG. 2 is a cross-sectional view showing the ready-to-photograph state of the zoom lens barrel to which the lens-frame moving mechanism of the present invention is applied; the upper-half of FIG. 2 indicates the ready-to-photograph state of the zoom lens barrel at the short-focal length extremity (the wide-angle position), and a lower-half of FIG. 2 indicates the ready-to-photograph state of the zoom lens barrel at the long-focal length extremity (the telephoto position)

A third-lens-group frame 8 holding the shutter S and the third lens group LG3 are supported inside the first advancing barrel 15. The third-lens-group frame 8 is linearly movable in the optical axis direction without rotating relative to the stationary barrel 22. The third-lens-group frame 8 is also provided with a swingable frame (not shown) that holds the third lens group LG3 and moves the third lens group LG3 about an axis positioned radially away from the optical axis. Due to this arrangement, the third lens group LG3 is positioned so that the optical axis of the third lens group LG3 is coaxial with that of the first lens group LG1, the second lens group LG2 and the fourth lens group LG4 (i.e., with the photographing optical axis O) in the ready-to-photograph state as shown in FIG. 2, whereas the third lens group LG3 positioned at an off-axis position so that the optical axis of the third lens group LG3 is positioned radially away from the that of the first lens group LG1, the second lens group LG2 and the fourth lens group LG4 (i.e., with the photographing optical axis O) in the retracting position, as shown in FIG. 1.

Figure 6:
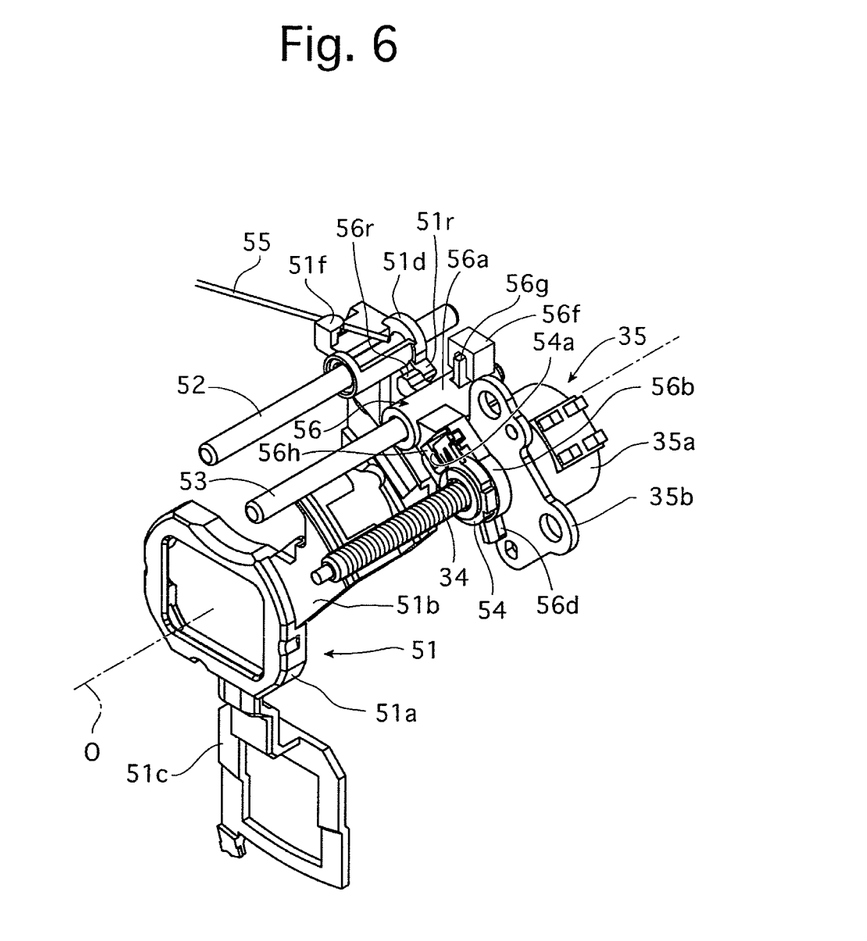
FIG. 6 is a perspective view of the main components of the lens-frame moving mechanism according to the present invention.

As shown in FIG. 6, a fourth-lens-group frame 51 is provided with a lens-holding portion 51a which holds the fourth lens group LG4. Furthermore, fourth-lens-group frame 51 is provided with a pair of guide arms 51b and 51c that extend in opposite directions from the lens-holding portion 51a. A tubular guide portion 51d is integrally formed with the guide arm 51b, and a fourth-lens-group guide shaft 52, on which the tubular guide portion 51d is slidably mounted, is fixed between the stationary barrel 22 and the lens-barrel rear plate 21. Furthermore, the fourth-lens-group frame 51 is provided with a spring-hook protrusion 51f, and a torsion spring (biaser) 55 that is fixed (by a predetermined device) to the stationary barrel 22 is hooked onto the spring-hook protrusion 51f so that the fourth-lens-group frame 51 is biased toward the object in the optical axis direction.

Figure 4:
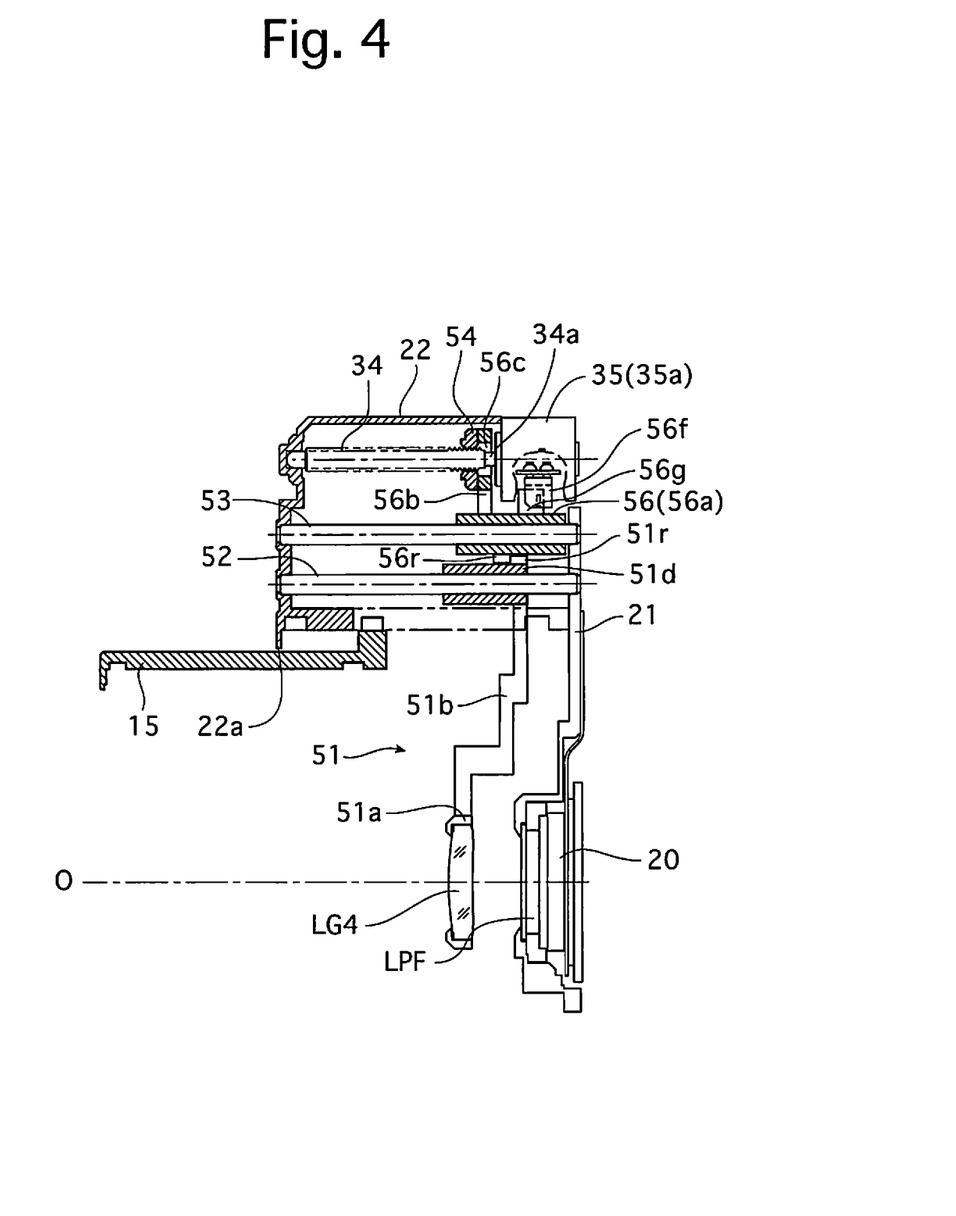
FIG. 4 is a cross-sectional view of the lens-frame moving mechanism according to the present invention, showing the lens frame (the fourth-lens-group frame 51) and the intermediate linearly movable member arranged at respective positions corresponding to the minimum object-distance photographing state.
Figure 5:
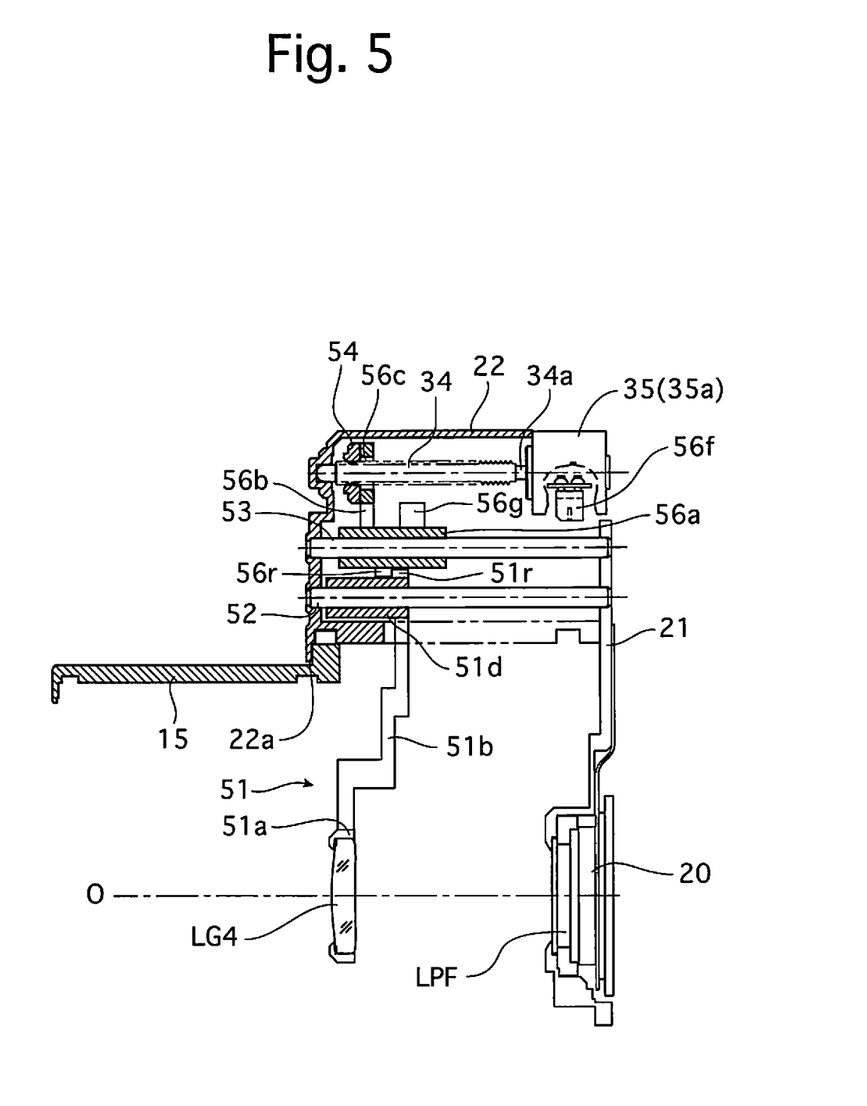
FIG. 5 is a cross-sectional view of the lens-frame moving mechanism according to the present invention, showing the lens frame (the fourth-lens-group frame 51) and the intermediate linearly movable member arranged at respective positions corresponding to the infinite object-distance photographing state.

An intermediate member guide shaft 53 which is parallel to the fourth-lens-group guide shaft 52 is mounted to the stationary barrel 22 and the lens-barrel rear plate 21 so as to extend therebetween. Furthermore, a focusing motor 35 (hereinafter, a motor 35) is fixed to the stationary barrel 22 and is provided with a leading screw 34 which extends parallel with both the fourth-lens-group guide shaft 52 and the intermediate member guide shaft 53. The leading screw 34 is directly formed on a drive shaft 34a of the motor 35. The leading screw 34 rotates in accordance with control-information from a controller (not shown), for example, a CPU. The intermediate member guide shaft 53 and the leading screw 34 are provided for moving an intermediate linearly-movable member 56, in the optical axis direction, in accordance with information on an object distance. The intermediate linearly-movable member 56 is provided with a tubular guide portion 56a through which the intermediate member guide shaft 53 passes, a nut-engaging arm 56b extending from the tubular guide portion 56a, and a screw hole 56c through which the leading screw 34 loosely passes, as shown in FIGS. 4 through 6. The leading screw 34, the fourth-lens-group guide shaft 52 and the intermediate member guide shaft 53, which linearly guides the intermediate linearly-movable member 56, are positioned radially outside the first advancing barrel 15. A guide protrusion 56d is formed at an end of the nut-engaging arm 56b, as shown in FIG. 6. The guide protrusion 56d is arranged to engage a guide groove (not shown), which is formed on the stationary barrel 22 and extends parallel with the optical axis, in order to prevent the intermediate linearly-movable member 56 from rotating. Furthermore, an origin detecting protrusion 56g is formed on the intermediate linearly-movable member 56 (see FIG. 5). The origin detecting protrusion 56g is arranged to function together with an origin detector 56f that is fixed on the stationary barrel 22 in order to detect the origin of the intermediate linearly-movable member 56 with respect to the optical axis direction. The position of the origin detecting protrusion 56g (the intermediate linearly-movable member 56) in the optical axis direction (the origin) can be detected by the origin detector 56f, so that the position of the fourth-lens-group frame 51, in the optical axis direction, can be detected.

A nut member 54, which is provided in front of the nut-engaging arm 56b, is screw-engaged with the leading screw 34. The nut member 54 is provided with a rotation-prevention groove 54a which is defined by two radially extending protrusions from the body of the nut member 54. The nut member 54 is prevented from rotating by inserting a radial protrusion 56h formed on the intermediate linearly-movable member 56 into the rotation-prevention groove 54a. A casing 35a of the motor 35 is provided with a bracket 35b that is integrally formed thereon. The bracket 35b is fixed to the stationary barrel 22 so that the leading screw 34 can be extended, from the casing 35a, to be parallel with the optical axis. Positioning the casing 35a closer to the image side and positioning the leading screw 34 closer to the object side in the optical axis direction as described above, is advantageous for miniaturizing the zoom lens barrel 1, compared with a zoom lens barrel in which the motor casing is positioned closer to the object side and the leading screw extends toward the image side from the motor casing.

Figure 3:
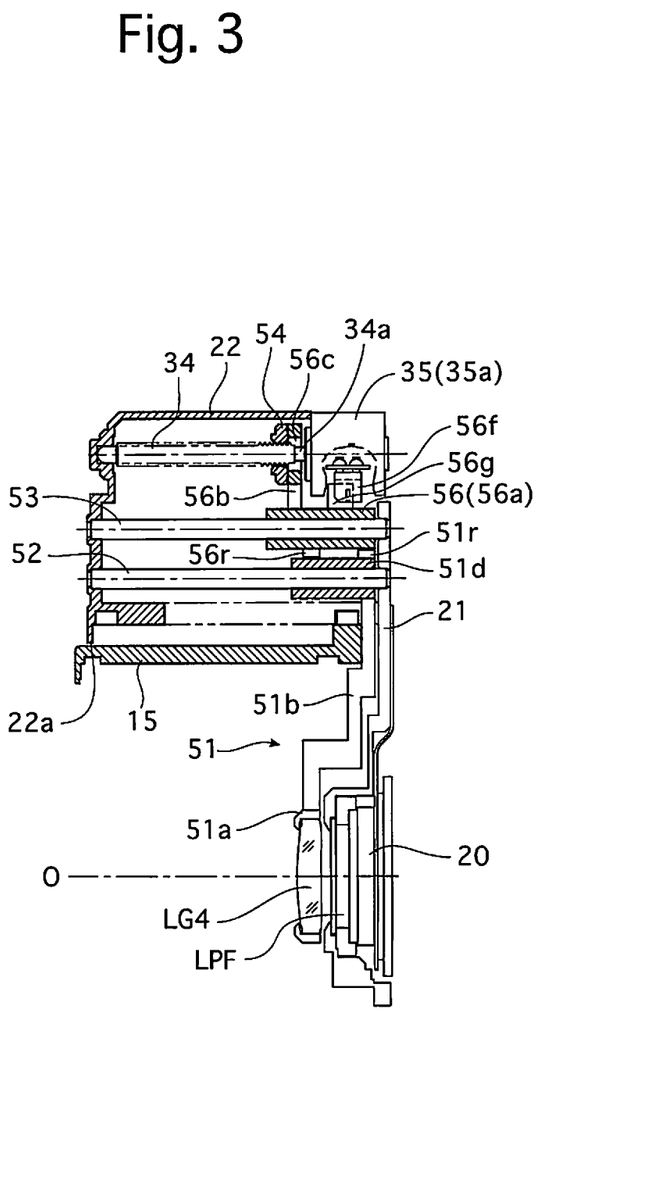
FIG. 3 is a cross-sectional partial view, based on the retracted position of the zoom lens barrel of FIGS. 1 and 2, only showing the lens-frame moving mechanism according to the present invention.

As explained above, the fourth-lens-group frame 51 is slidably movable with respect to the fourth-lens-group guide shaft 52, by inserting the fourth-lens-group guide shaft 52 into the tubular guide portion 51d, and is biased by a torsion spring 55 toward the object side in the optical axis direction, and the fourth-lens-group frame 51 is slidably movable, against the biasing force of the torsion spring 55, toward the image side in the optical axis direction. The fourth-lens-group frame 51 and the intermediate linearly-movable member 56 are respectively provided with a unidirectional interlocking member 51r and a unidirectional interlocking member 56r. Unless an external force other than the biasing force of the torsion spring 55 is applied, the unidirectional interlocking member 51r and the unidirectional interlocking member 56r are always in contact with each other, as shown in FIGS. 4 and 5. Whereas when an external force toward the image side is applied to the fourth-lens-group frame 51, the fourth-lens-group frame can move independently from the intermediate linearly-movable member 56, as shown in FIG. 3, in which the unidirectional interlocking members 51r and 56r are relatively positioned away from each other with respect to the optical axis direction. Furthermore, the intermediate linearly-movable member 56 is biased in the forward direction by the torsion spring 55 via the fourth-lens-group frame 51 that is biased in the forward direction so that the nut-engaging arm 56b is in contact with the nut member 54. When the leading screw 34 rotates and the nut member 54 linearly moves in the optical axis direction, the intermediate linearly-movable member 56 moves together with the nut member 54. The fourth-lens-group frame 51 moves in the optical axis direction with the movement of the intermediate linearly-movable member 56.

The operations of the lens-frame moving mechanism according to the present invention will be explained hereinafter. The retracted state shown in FIGS. 1 and 3 is a state in which the first advancing barrel 15 is pressed against the fourth-lens-group frame 51, the unidirectional interlocking member 51r has been rearwardly retracted until moving rearwardly away from the unidirectional interlocking member 56r, the first advancing barrel 15 has been fully retracted into the camera body, and the camera body is in its slimmest state in which the zoom lens system in the photographing optical axis direction is at a minimum length. From the retracted state shown in FIGS. 1 and 3, when the main switch (not shown) of the camera is turned on, the zoom motor M is activated to advance (drive) the first advancing barrel 15 in the optical axis direction toward the object side. The fourth-lens-group frame 51 follows the first advancing barrel 15 by the biasing force of the torsion spring 55 until the unidirectional interlocking member 51r and the unidirectional interlocking member 56r come into contact with each other and then the fourth-lens-group frame 51 stops. Namely, the fourth-lens-group frame 51 moves independently from the intermediate linearly-movable member 56 until the unidirectional interlocking member 51r comes into contact with the unidirectional interlocking member 56r of the intermediate linearly-movable member 56. The zoom motor M continues driving and stops when the first advancing barrel 15 arrives at the ready-to-photograph position as shown in FIG. 4.

At the ready-to-photograph position, the leading screw 34 of the motor 35 is arranged to rotate in accordance with the object distance obtained from an object-distance measuring device (not shown), the rotation of the leading screw 34 causes the nut member 54 to linearly move in the optical axis direction to thereby move the intermediate linearly-movable member 56, to which the fourth-lens-group frame 51 follows. These movements are maintained when the biasing force of the torsion spring 55 is the only external force applied to the fourth-lens-group frame 51. Namely, these movements are maintained when the unidirectional interlocking member 51r of the fourth-lens-group frame 51 and the unidirectional interlocking member 56r of the intermediate linearly-movable member 56 maintain in contact with each other, as shown in FIGS. 4 and 5, both of which show the ready-to-photograph state. Note that in the ready-to-photograph state, the first advancing barrel 15 does not interfere with (contact) the fourth-lens-group frame 51.

FIG. 4 is a cross-sectional view of the zoom lens barrel of FIG. 2 and indicates the intermediate linearly-movable member 56 at the rearward extremity (closest to image side) of the moving range thereof, while the unidirectional interlocking member 51r of the fourth-lens-group frame 51 and the unidirectional interlocking member 56r of the intermediate linearly-movable member 56 remain in contact with each other.

FIG. 5 is a cross-sectional view of the zoom lens barrel of FIG. 2 focused on an object at the minimum distance, and indicates the intermediate linearly-movable member 56 at forward extremity (closest to the object side) of the moving range thereof, while the unidirectional interlocking member 51r of the fourth-lens-group frame 51 and the unidirectional interlocking member 56r the intermediate linearly-movable member 56 remain in contact with each other.

On the other hand, when the main switch is turned off, the leading screw 34 is reversely rotated by the motor 35, so that the fourth lens group LG4 moves until the fourth lens group LG4 reaches the rearward extremity (closest to the image side) of the moving range thereof attained by the leading screw 34; thereafter, the first advancing barrel 15, which is driven by the zoom motor M to move rearwardly, pushes the fourth-lens-group frame 51. At the retracted state, the unidirectional interlocking member 51r and the unidirectional interlocking member 56r are positioned away from each other in the optical axis direction, so that the zoom optical system attains a reduction in the minimum length thereof (see FIG. 3). Although it is possible to achieve a reduction in the minimum length of the zoom lens system even if the traveling distance of the fourth-lens-group frame 51 from the ready-to-photograph state to the retracted state is only approximately 0.5 mm, if the traveling distance of the fourth-lens-group frame 51 is set to 2 mm or more, the minimum length of the zoom optical system can be achieved so as to correspond to a long backfocus.

The lens-frame moving mechanism shown in FIGS. 1 and 2 is merely an example.

The present invention is not limited to the above-described structure, and can be applied to a lens barrel in general, in which a rearwardly-movable member (a rearward driving member) is provided to rearwardly move the fourth-lens-group frame toward the image along the optical axis when the lens barrel is moving rearwardly from the ready-to-photograph state to the retracted state.

According to the present invention, the first advancing barrel 15 pushes and rearwardly moves the fourth-lens-group frame 51 toward the image side along the optical axis; however, the first advancing barrel 15 can be substituted by a member which is arranged to rearwardly move (either linearly or while rotating) toward the image side along the optical axis when the lens barrel is returning from the ready-to-photograph state to the retracted state.

The lens-frame moving mechanism according to the present invention has been explained with the above-explained embodiment in which the lens-frame moving mechanism is applied to the fourth lens group LG4 as a focusing lens group; however, the present invention can be applied to a movable lens group other than a focusing lens group. Furthermore, although the arrangement disclosed in the illustrated embodiment of the present invention drives the motor 35 based on control information output by the controller, such control information includes, for example, control information for driving the motor 35 to move the fourth lens group LG4 to a position in accordance with object distance information that is measured by a distance measuring device provided in the camera, and control information for driving the motor 35 to move the fourth lens group LG4 to an in-focus position that is obtained by detecting the in-focus position (a position at which a contrast peak is attained) while moving the fourth lens group LG4 between the infinite photographing distance position and the minimum photographing distance position in a camera provided with an autofocus device employing an image-contrast method.

According to the present invention, after a specific lens group (frame) reaches a ready-to-photograph position, the specific lens group (frame) moves together with the intermediate linearly movable member which is moved by the nut member being screwed to the leading screw of the motor; on the other hand, between the ready-to-photograph position and the retracted position, the specific lens group (frame) is moved by the rearwardly-movable member, which is arranged to move the specific lens group (frame), in place of the intermediate linearly movable member. Therefore, a longer traveling distance of the specific lens group (frame) can be achieved without requiring a longer leading screw, and the length (thickness) of a lens-frame moving mechanism can be reduced.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A lens-frame moving mechanism, comprising:
   a lens frame which holds a lens group and is linearly and slidingly guided by a guide shaft to move, in an optical axis direction of said lens group, between a ready-to-photograph position and a retracted position, said lens frame being biased forwardly in the optical axis direction by a biaser;
   an intermediate linearly movable member which is linearly guided to move in the optical axis direction, wherein said intermediate linearly movable member is separately movable from said lens frame, and said lens frame that is forwardly biased by said biaser in the optical axis direction contacts said intermediate linearly movable member;
   a leading screw which is directly formed on a drive shaft of a motor, by which said leading screw is rotated, wherein said drive shaft non-engagingly passes through said intermediate linearly movable member;
   a nut member which is screw-engaged onto said leading screw, wherein said nut member does not rotate relative to said lens frame and is arranged to move said intermediate linearly movable member in the optical axis direction, and wherein said nut member and said intermediate linearly movable member constantly contact each other; and
   a rearwardly-movable member which is arranged to rearwardly move said lens frame against said biasing force applied thereto by said biaser such that said lens frame moves away from said intermediate linearly movable member in the optical axis direction while said lens frame is moved from the ready-to-photograph position to the retracted position.

2. The lens-frame moving mechanism according to claim 1, wherein a traveling distance of said lens frame from the ready-to-photograph position to the retracted position is 2 mm or more.

3. The lens-frame moving mechanism according to claim 1, wherein said lens group held by said lens frame comprises a focusing lens group which is positioned closest to the image side of a photographing lens system including a plurality of lens groups.

4. The lens-frame moving mechanism according to claim 1, wherein an origin detector, which detects a position of said intermediate linearly movable member in the optical axis direction, is provided between said intermediate linearly movable member and a stationary member.

5. The lens-frame moving mechanism according to claim 4, wherein said motor is mounted to said stationary member so that said leading screw extends forwardly in the optical axis direction.

6. The lens-frame moving mechanism according to claim 5, wherein said rearwardly-movable member is arranged to be driven by a second motor other than said motor having said leading screw, said rearwardly-movable member comprising an annular member which is arranged to move in the optical axis direction.

7. The lens-frame moving mechanism according to claim 6, wherein a first guide shaft for linearly guiding said leading screw and a second guide shaft for linearly guiding said intermediate linearly movable member are provided radially outside of said annular member.

* * * * *